(12) United States Patent
Wang

(10) Patent No.: US 8,191,219 B2
(45) Date of Patent: Jun. 5, 2012

(54) ASSEMBLY MECHANISM FOR EXTERNAL BOX

(75) Inventor: Jen-Hung Wang, Chung Ho (TW)

(73) Assignee: Chemtron Research LLC, Dover, DE (US)

( * ) Notice: Subject to any disclaimer, the term of this patent is extended or adjusted under 35 U.S.C. 154(b) by 1344 days.

(21) Appl. No.: 11/878,188

(22) Filed: Jul. 23, 2007

(65) Prior Publication Data

US 2008/0034569 A1 Feb. 14, 2008

(30) Foreign Application Priority Data

Aug. 8, 2006 (TW) .............................. 95213943 U

(51) Int. Cl.
*B25B 27/14* (2006.01)

(52) U.S. Cl. ................... 29/281.5; 29/466; 361/679.02; 361/727

(58) Field of Classification Search ............ 361/679.39, 361/679.58, 679.01, 679.02, 679.41, 679.43, 361/679.57, 727; 29/434, 464, 466, 281.5
See application file for complete search history.

(56) References Cited

U.S. PATENT DOCUMENTS

| | | | | |
|---|---|---|---|---|
| 5,121,296 A * | 6/1992 | Hsu | ........................... | 361/679.39 |
| 5,124,887 A * | 6/1992 | Kobayashi | ............... | 361/679.39 |
| 5,442,513 A * | 8/1995 | Lo | ............................. | 361/679.35 |
| 6,373,695 B1 * | 4/2002 | Cheng | ...................... | 361/679.39 |
| 6,885,558 B2 * | 4/2005 | Yokote et al. | ................. | 361/732 |
| 6,965,516 B1 * | 11/2005 | Lin | ............................... | 361/727 |
| 7,046,505 B2 * | 5/2006 | Hsu | ........................... | 361/679.39 |
| 7,109,831 B2 * | 9/2006 | McMiller et al. | ............... | 334/88 |
| 7,152,443 B2 * | 12/2006 | Chang et al. | ..................... | 70/352 |
| 7,206,200 B2 * | 4/2007 | Chung | ..................... | 361/679.39 |
| 7,374,259 B2 * | 5/2008 | Wu et al. | ..................... | 312/223.2 |
| 7,486,506 B2 * | 2/2009 | Chen et al. | ............... | 361/679.02 |
| 7,495,904 B2 * | 2/2009 | Liang et al. | ................. | 361/679.39 |
| 2004/0125556 A1 * | 7/2004 | Chen et al. | ..................... | 361/685 |
| 2005/0030709 A1 * | 2/2005 | Yang | ............................. | 361/683 |
| 2005/0122675 A1 * | 6/2005 | Cheng | .......................... | 361/685 |
| 2005/0128699 A1 * | 6/2005 | Peng et al. | ..................... | 361/686 |
| 2005/0213295 A1 * | 9/2005 | Perez et al. | ..................... | 361/683 |
| 2005/0286217 A1 * | 12/2005 | Bang | ............................. | 361/683 |
| 2006/0209501 A1 * | 9/2006 | Han | ............................... | 361/679 |
| 2006/0227501 A1 * | 10/2006 | Lin | ................................ | 361/685 |
| 2006/0245149 A1 * | 11/2006 | Ku et al. | ....................... | 361/679 |
| 2006/0262494 A1 * | 11/2006 | Chen et al. | ..................... | 361/683 |
| 2007/0127204 A1 * | 6/2007 | Muenzer et al. | .............. | 361/685 |

* cited by examiner

*Primary Examiner* — David Bryant
*Assistant Examiner* — Christopher Koehler
(74) *Attorney, Agent, or Firm* — Turocy & Watson, LLP

(57) ABSTRACT

An assembly mechanism for an external box includes a casing body, a cover body, and a retaining body. The casing body has an opening formed on one side thereof. The cover body is assembled on the casing body. The retaining body is used for sliding the cover body to approach the opening in order to retain the cover body and the casing body together or for sliding the cover body out from the opening in order to separate the cover body from the casing body. Hence, it is easy for users to assemble or detach the external box of the present invention and the cost of the present invention is less than that of the prior art. Therefore, the present invention can solve the problem of needing to use a number of screws to assemble the external box of the prior art.

12 Claims, 7 Drawing Sheets

ASSEMBLY MECHANISM FOR EXTERNAL BOX

BACKGROUND OF THE INVENTION

1. Field of the Invention

The present invention relates to an external box, and particularly relates to an assembly mechanism for an external box.

2. Description of the Related Art

An external box of the prior art is used to receive a hard disk and has a built-in USB port for supporting low-speed data transmission such as that transmitted by a mouse, a keyboard, or a joystick, etc., and for supporting high-speed digital compression images, too. Moreover, the external box has a hard disk switch and supports a number of types of operating systems.

Referring to FIG. 1, the prior external box has a bottom casing body 101 and a top casing body 102. The bottom casing body 101 has a receiving space for receiving a hard disk (not shown). The bottom casing body 101 has a plurality of function ports 1011 and a hard disk switch 1012. The top casing body 102 is fixed on the bottom casing body 101 via a plurality of screws.

However, when a user wants to assemble the external box, the user needs to use screws 104 to screw the top casing body 102 onto the bottom casing body. Hence, the screws 104 increase costs and are not convenient for the user who needs to assemble or detach the external box.

SUMMARY OF THE INVENTION

The present invention provides an assembly mechanism for an external box. The present invention has a retaining body that can be used for sliding the cover body to approach the opening in order to retain the cover body and the casing body together or for sliding the cover body out from the opening in order to separate the cover body from the casing body. Hence, it is easy for users to assemble or detach the external box of the present invention and the cost of the present invention is less than that of the prior art. Therefore, the present invention can solve the problem of needing to use a number of screws to assemble the external box of the prior art.

Moreover, the casing body has two first tracks disposed on two external walls thereof. The cover body has two second tracks disposed on two external walls thereof. The two second tracks mate with the two first tracks for assembling the cover body on the casing body.

A first aspect of the present invention is an assembly mechanism for an external box. The assembly mechanism includes a casing body, a cover body, and a retaining body. The casing body has an opening formed on one side thereof. The cover body is assembled on the casing body. The retaining body is used for sliding the cover body to approach the opening in order to retain the cover body and the casing body together or for sliding the cover body out from the opening in order to separate the cover body from the casing body.

A second aspect of the present invention is an assembly mechanism for an external box. The assembly mechanism includes a casing body, a cover body, and a retaining body. The casing body has an opening formed on one side thereof. The retaining body has a first retaining element slidably retained in a retaining groove of the casing body. The retaining body has a push block. When the push block pushes the first retaining element, the first retaining element separates from the retaining groove in order to slide the cover body out from the casing body.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
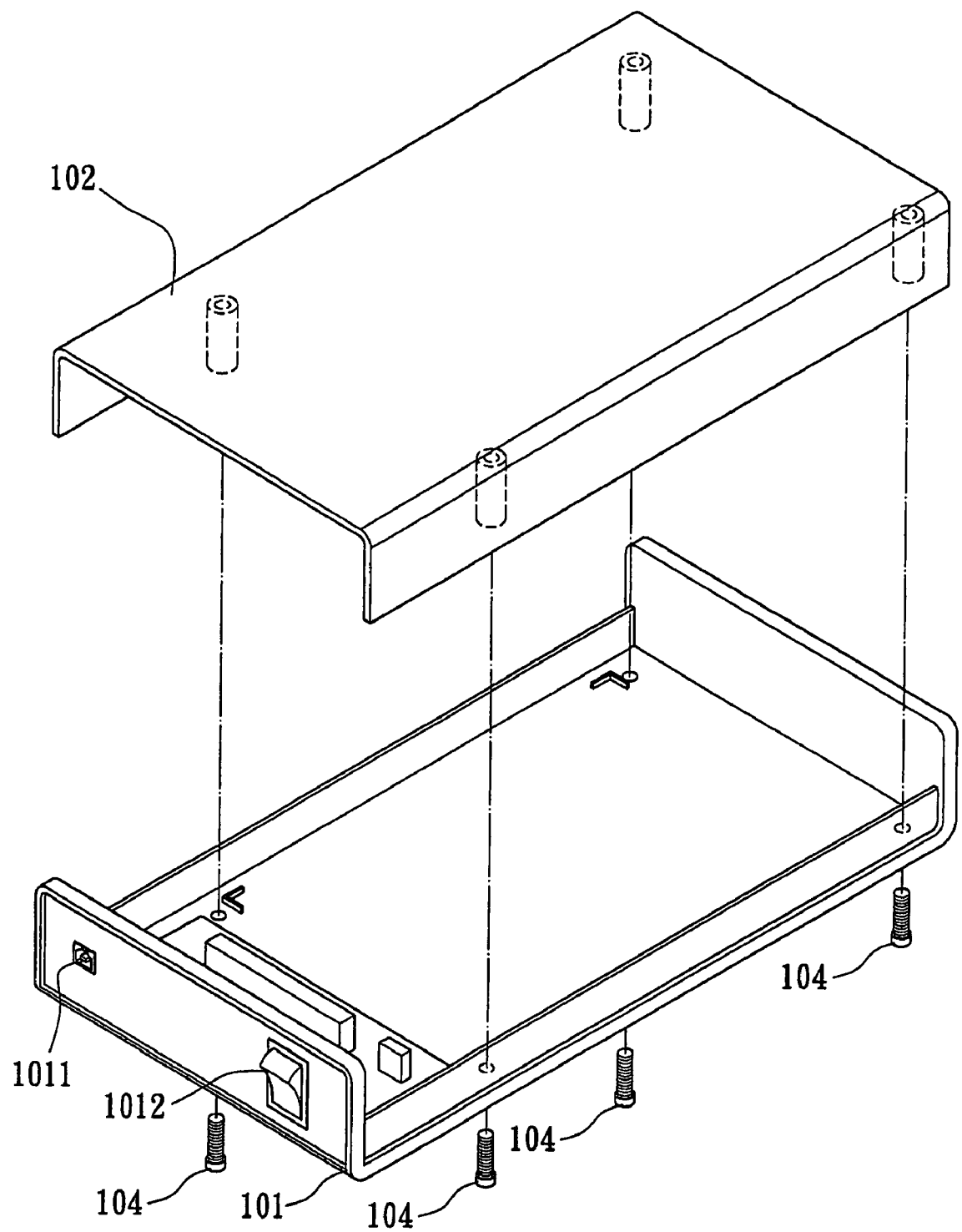
FIG. 1 is a perspective, exploded view of an assembly mechanism for an external box of the prior art.
Figure 2:
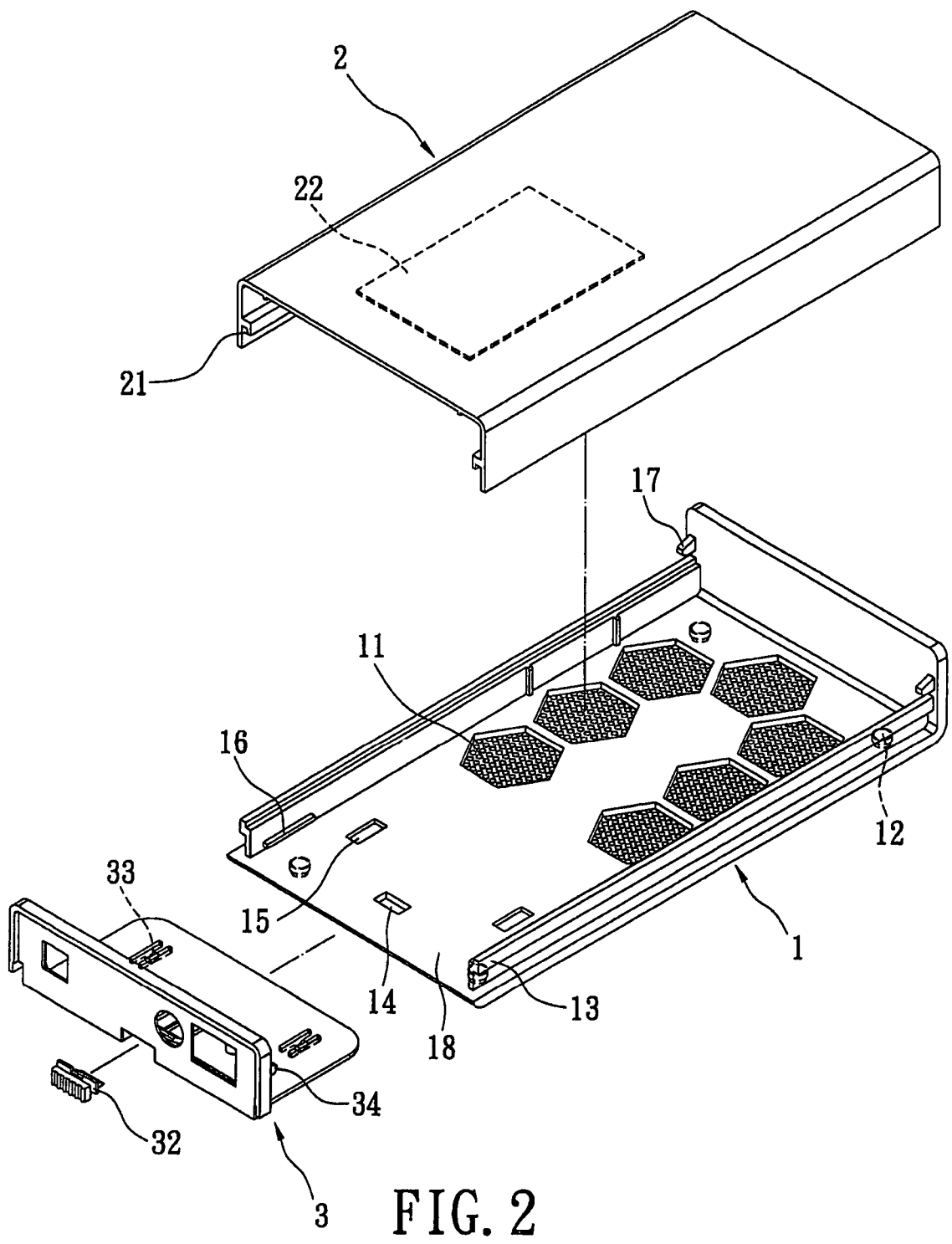
FIG. 2 is a perspective, exploded view of an assembly mechanism for an external box of the present invention.
Figure 3:
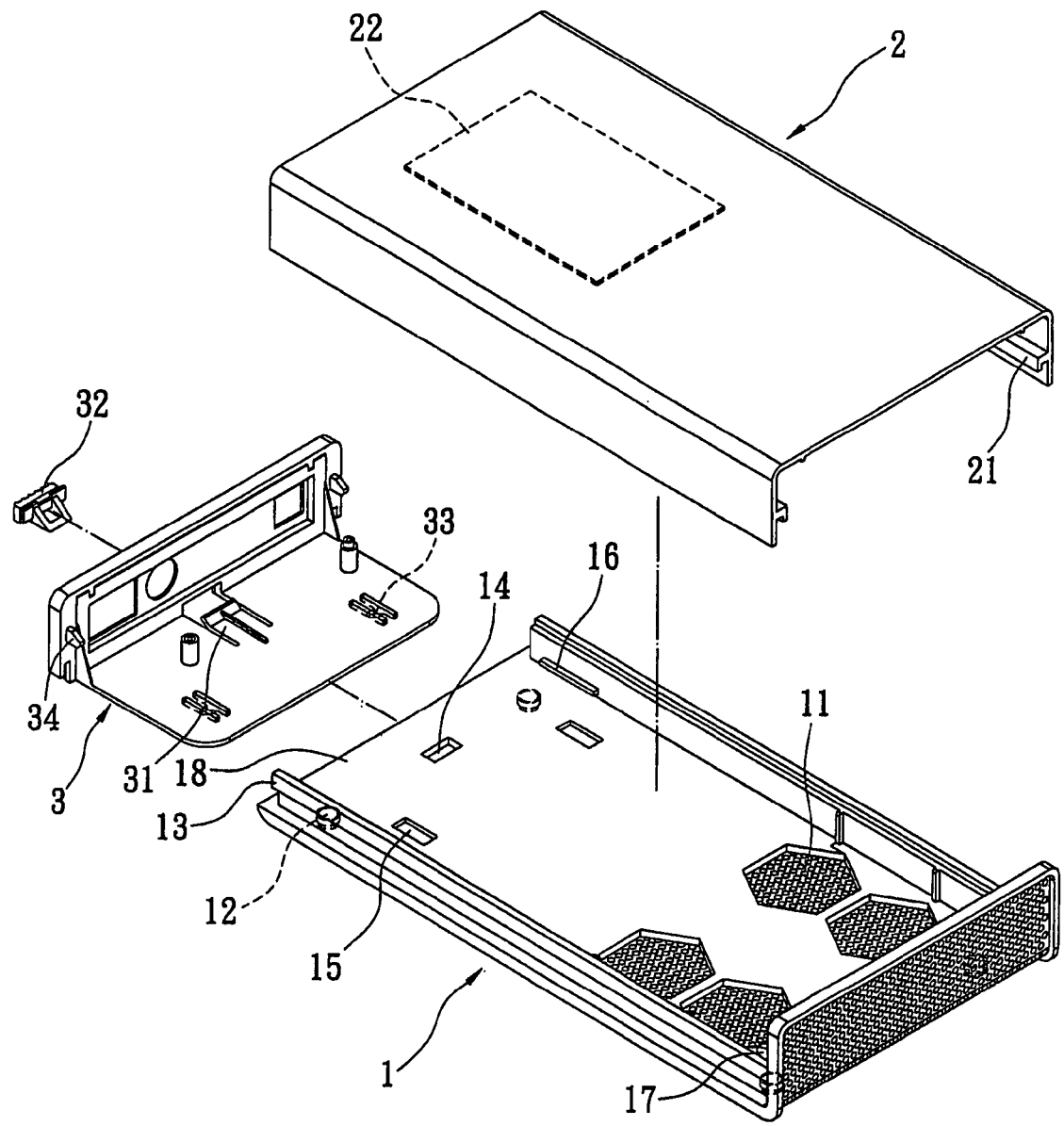
FIG. 3 is another perspective, exploded view of an assembly mechanism for an external box of the present invention.
Figure 4:
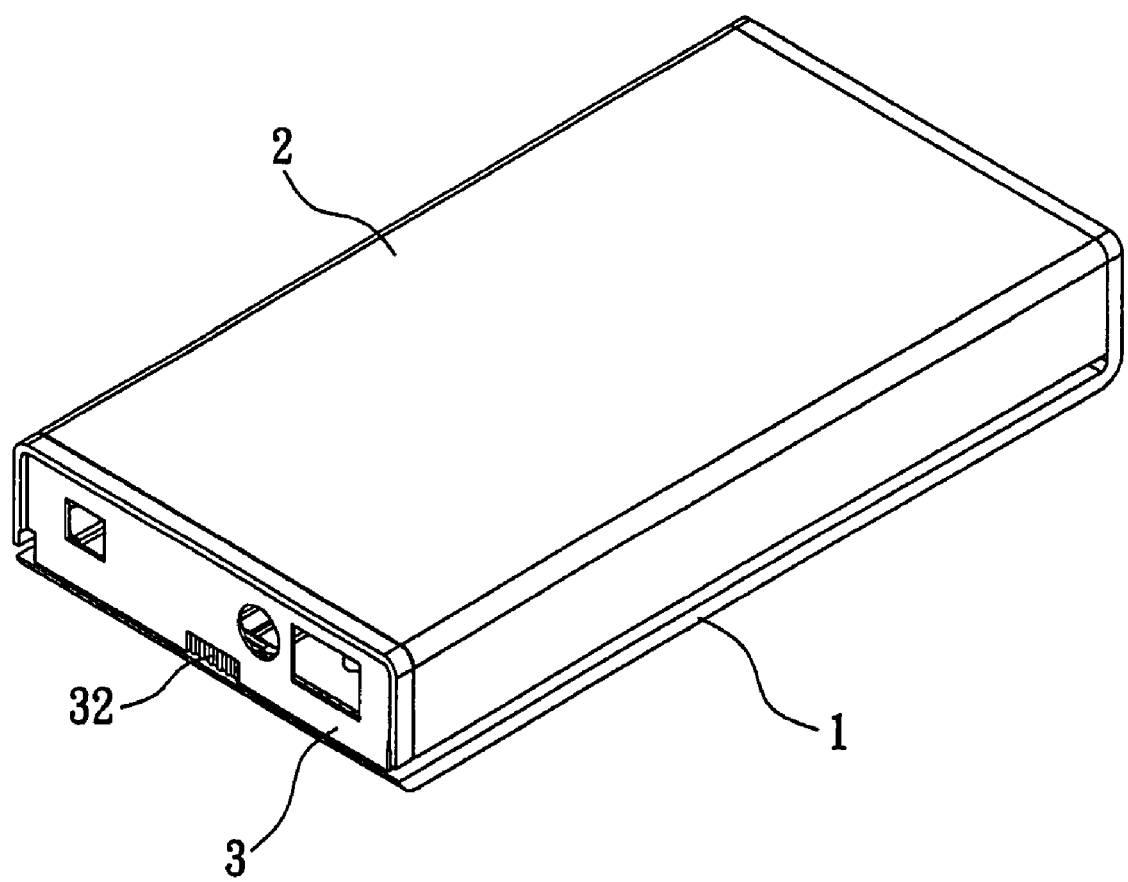
FIG. 4 is a perspective, assembled view of an assembly mechanism for an external box of the present invention.

Referring to FIGS. 2 to 4, the present invention provides an assembly mechanism for an external box including a casing body 1, a cover body 2, and a retaining body 3. The casing body 1 has an opening 18 formed on one side thereof. The cover body 2 is assembled on the casing body 1. The retaining body 3 is used for sliding the cover body 2 to approach the opening 18 in order to retain the cover body 2 and the casing body 1 together or for sliding the cover body 2 out from the opening 18 in order to separate the cover body 2 from the casing body 1. The casing body 1 is a metallic casing body. The casing body 1 has a heat-dissipating net structure 11 disposed on a bottom side thereof for dissipating heat from a hard disk (not shown). The casing body 1 has a plurality of fixed portions 12 disposed on a bottom side thereof for preventing the box body from sliding out, so that the casing body 1 can be placed stably. The casing body 1 has two first tracks 13 disposed on two external walls thereof. The cover body 2 has two second tracks 21 disposed on two external walls thereof. The two second tracks 21 mate with the two first tracks 13 in order to assemble the cover body 2 on the casing body 1. The cover body 2 has at least one heat-dissipating pad 22 disposed on an inner surface thereof in order to dissipate heat from a hard disk (not shown).

The casing body 1 has a retaining groove 14. The retaining body 3 has a first retaining element 31 that is retained in the retaining groove 14. The retaining body 3 has a push block 32.

When a user presses the push block 32 to push the first retaining element 31, the first retaining element 31 can be separated from the retaining groove 14 in order to separate the cover body 2 from the casing body 1. The casing body 1 has a plurality of restricting grooves 15. The retaining body 3 has a plurality of second retaining elements 33 respectively retained in the restricting grooves 15. The casing body 1 has a plurality of positioning portions 16 for positioning the retaining body 3. The casing body 1 has two first fixed portions 17 disposed on two lateral sides thereof in order to fix the cover body 2 on the casing body 1. The retaining body 3 has two second fixed portions 34 disposed on two lateral sides thereof in order to fix the cover body 2 on the casing body 1.

Figure 5:
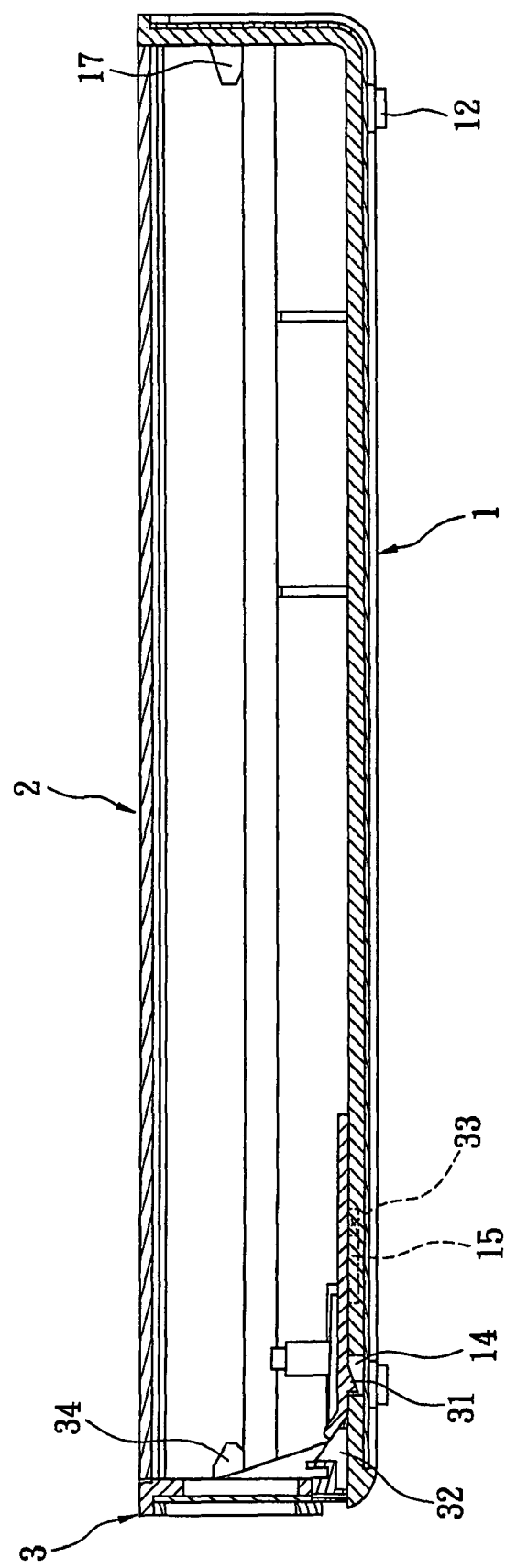
FIG. 5 is a cross-sectional view of the retaining body being used to retain the cover body and the casing body together according to the present invention.
Figure 6:
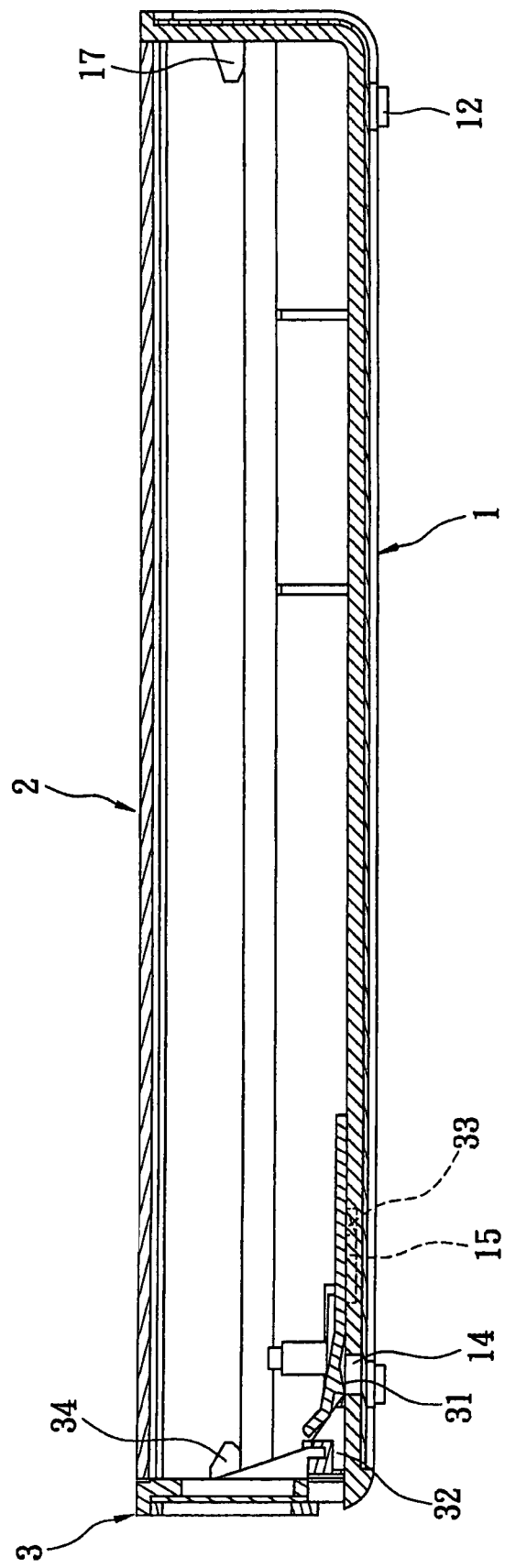
FIG. 6 is a cross-sectional view of the first retaining element separated from the retaining groove according to the present invention.
Figure 7:
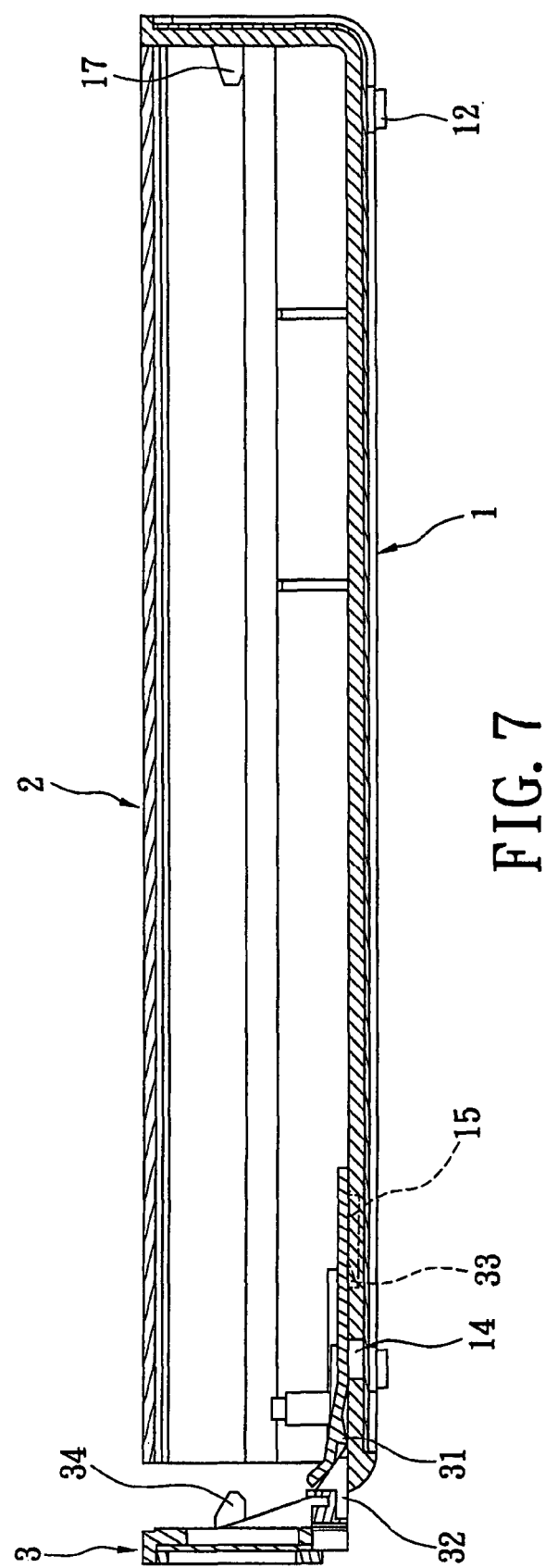
FIG. 7 is a cross-sectional view of the retaining body separated from the opening of the casing body according to the present invention.

Referring to FIGS. 5 to 7, when the first retaining element 31 is retained in the retaining groove 14 in order to retain the casing body 1, the first fixed portions 17 and the second fixed portions are used to fix the cover body 2 on the casing body 1. Each second retaining element 33 is retained in one side of the corresponding restricting groove 15 (as shown in FIG. 5). When a user presses the push block 32 to push the first retaining element 31, the first retaining element 31 can be moved upwardly and separated from the retaining groove 14 (as shown in FIG. 6). Because the first retaining element 31 separates from the retaining groove 14, the retaining body 3 is slid out from the opening 18 in order to separate the cover body 2 from the casing body 1. At the same time, each second retaining element 33 is retained in the other side of the corresponding restricting groove 15 (as shown in FIG. 7). The sliding distance of the retaining body 3 is determined according to the length of the restricting groove 15.

In conclusion, the assembly mechanism of the external box of the present invention has the following advantages:

(1) The casing body 1 has a heat-dissipating net structure 11 disposed on the bottom side thereof and the cover body 2 has at least one heat-dissipating pad 22 disposed on the inner surface thereof in order to dissipate heat from a hard disk (not shown).

(2) The two second tracks 21 mate with the two first tracks 13 in order to assemble the cover body 2 on the casing body 1.

(3) The retaining body 3 is used for sliding the cover body 2 to approach the opening 18 in order to retain the cover body 2 and the casing body 1 together or for sliding the cover body 2 out from the opening 18 in order to separate the cover body 2 from the casing body 1. Hence, it is easy for users to assemble or detach the external box of the present invention and the cost of the present invention is less than that of the prior art.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An external box assembly, comprising:
   a casing body having an opening formed on one side thereof, wherein a retaining groove is arranged on the inner bottom surface thereof proximate the opening;
   a cover body coveringly disposed on the casing body; and
   a retaining body adapted to enclosingly couple the case body and the cover body, including a first retaining element engageable with the retaining groove, wherein the first retaining element has a slanted surface arranged toward the opening; and
   a push block accessibly arranged to slide on the inner bottom surface of the casing body, the push block having a wedge surface arranged toward the opening and correspondingly aligns the slanted surface of the retaining body,
   wherein the first retaining element is raisable by the push block to disengage from the retaining groove, thereby enabling the release of the cover body from the casing body.

2. The external box assembly as claimed in claim 1, wherein the casing body is a metallic casing body.

3. The external box assembly as claimed in claim 1, wherein the casing body has a heat-dissipating net structure disposed on a bottom side thereof.

4. The external box assembly as claimed in claim 1, wherein the casing body has a plurality of fixed portions disposed on a bottom side thereof for preventing the casing body from sliding out.

5. The external box assembly as claimed in claim 1, wherein the casing body has two first tracks disposed on two opposing side walls thereof.

6. The external box assembly as claimed in claim 5, wherein the cover body has two second tracks disposed on two external walls thereof, and the two second tracks mate with the two first tracks for assembling the cover body on the casing body.

7. The external box assembly as claimed in claim 1, wherein the cover body has at least one heat-dissipating pad disposed on an inner surface thereof.

8. The external box assembly as claimed in claim 1, wherein the casing body has a plurality of restricting grooves arranged on the bottom surface of the casing body.

9. The external box assembly as claimed in claim 8, wherein the retaining body has a plurality of second retaining elements respectively engageable with the restricting grooves.

10. The external box assembly as claimed in claim 1, wherein the casing body has a plurality of positioning portions for positioning the retaining body.

11. The external box assembly as claimed in claim 1, wherein the casing body has two first fixed portions disposed on two lateral sides thereof in order to fix the cover body on the casing body.

12. The external box assembly as claimed in claim 1, wherein the retaining body has two second fixed portions disposed on two lateral sides thereof in order to fix the cover body on the casing body.

* * * * *